(12) United States Patent
Liang et al.

(10) Patent No.: US 10,915,147 B2
(45) Date of Patent: Feb. 9, 2021

(54) PORTABLE ELECTRONIC DEVICE AND METHOD OF CONTROLLING AN IMAGE OF A DISPLAY MODULE

(71) Applicant: Wistron Corp., New Taipei (TW)

(72) Inventors: Chen Yi Liang, New Taipei (TW);
Keng-Hsien Yang, New Taipei (TW);
Hsin Ting Ho, New Taipei (TW);
Cheng-Wei Chang, New Taipei (TW);
Fang-Wen Liao, New Taipei (TW)

(73) Assignee: WISTRON CORP., New Taipei (TW)

(*) Notice: Subject to any disclaimer, the term of this patent is extended or adjusted under 35 U.S.C. 154(b) by 21 days.

(21) Appl. No.: 16/197,286

(22) Filed: Nov. 20, 2018

(65) Prior Publication Data

US 2020/0064889 A1 Feb. 27, 2020

(30) Foreign Application Priority Data

Aug. 23, 2018 (TW) .............................. 107129391 A

(51) Int. Cl.
*G06F 1/16* (2006.01)
*G06F 3/041* (2006.01)
*G06F 3/0481* (2013.01)

(52) U.S. Cl.
CPC .......... *G06F 1/1662* (2013.01); *G06F 1/1616* (2013.01); *G06F 1/1624* (2013.01); *G06F 3/0412* (2013.01); *G06F 3/0416* (2013.01); *G06F 3/04817* (2013.01)

(58) Field of Classification Search
CPC .... G06F 1/1616; G06F 1/1647; G06F 1/1669; G06F 1/1679; G06F 1/1615; G06F 1/1626; G06F 1/1654; G06F 1/166; G06F 1/1677; G06F 1/1683; G06F 1/1698; G06F 1/26; G06F 1/266; G06F 3/147; G06F 3/0202; G09G 2330/02; G09G 2340/04; G09G 2340/0442; G09G 2340/0492; G09G 2340/14; G09G 2360/02

See application file for complete search history.

(56) References Cited

U.S. PATENT DOCUMENTS

| | | | |
|---|---|---|---|
| 5,818,360 A * | 10/1998 | Chu ...................... | G06F 1/1616 341/22 |
| 6,341,061 B1 * | 1/2002 | Eisbach ................ | G06F 1/1616 312/223.2 |
| 10,254,803 B1 * | 4/2019 | Quinn ................... | G06F 1/1688 |
| 2004/0108968 A1 * | 6/2004 | Finke-Anlauff ...... | G06F 1/1616 345/1.1 |

(Continued)

FOREIGN PATENT DOCUMENTS

| | | |
|---|---|---|
| CN | 203386107 U | 1/2014 |
| JP | 2015-038650 A | 2/2015 |

(Continued)

*Primary Examiner* — Christopher E Leiby

(57) ABSTRACT

A portable electronic device is provided and includes a first display module, a second display module, a keyboard device, a sensing unit and a control unit. The second display module is pivotally connected to the first display module. The sensing unit is configured to sense a position of the keyboard device relative to the second display module to output a sensing signal. The control unit is configured to control a displaying image of the second display module according to the sensing signal.

15 Claims, 16 Drawing Sheets

(56) References Cited

U.S. PATENT DOCUMENTS

| | | | |
|---|---|---|---|
| 2004/0190239 A1* | 9/2004 | Weng | G06F 1/1616 |
| | | | 361/679.2 |
| 2007/0153465 A1* | 7/2007 | Shih | G06F 1/1624 |
| | | | 361/679.09 |
| 2010/0039764 A1* | 2/2010 | Locker | G06F 1/1615 |
| | | | 361/679.29 |
| 2010/0328549 A1* | 12/2010 | Wu | G06F 1/1639 |
| | | | 348/744 |
| 2011/0216023 A1 | 9/2011 | Kurokawa | |
| 2011/0248947 A1 | 10/2011 | Krahenbuhl et al. | |
| 2012/0062442 A1* | 3/2012 | Locker | G06F 3/1446 |
| | | | 345/1.3 |
| 2013/0240933 A1 | 9/2013 | Yamazaki | |
| 2013/0257582 A1* | 10/2013 | Rothkopf | G06F 1/1656 |
| | | | 340/3.1 |
| 2014/0139987 A1* | 5/2014 | Onda | G06F 1/16 |
| | | | 361/679.02 |
| 2014/0204519 A1* | 7/2014 | Wu | G06F 1/1669 |
| | | | 361/679.17 |
| 2016/0140381 A1* | 5/2016 | Weiner | G06K 9/00087 |
| | | | 382/124 |
| 2019/0018636 A1* | 1/2019 | Kong | G06F 1/1647 |
| 2019/0377472 A1* | 12/2019 | Naylor | G06F 3/04812 |

FOREIGN PATENT DOCUMENTS

| | | |
|---|---|---|
| TW | 201205379 A1 | 2/2012 |
| TW | 201724605 A | 7/2017 |

* cited by examiner

PORTABLE ELECTRONIC DEVICE AND METHOD OF CONTROLLING AN IMAGE OF A DISPLAY MODULE

CROSS REFERENCE TO RELATED APPLICATIONS

This application claims the benefit of Taiwan Patent Application No. 107129391, filed Aug. 23, 2018, the entirety of which is incorporated by reference herein.

BACKGROUND OF THE DISCLOSURE

Field of the Disclosure

The present disclosure relates to a portable electronic device, and more particularly to a portable electronic device having two displaying screens.

Description of the Related Art

In modern society, computer-related electronic devices are already indispensable electronic products in people's lives. For example, smartphones, tablet computers, desktop computers, and notebook computers are very popular products. Among them, notebook computers are among the most popular of today's consumer products. Users can perform various applications on a notebook computer to achieve various purposes, such as watching video films, playing games, browsing the Internet, reading E-books, and performing other functions.

Generally speaking, according to the direction of product design, notebook computers can be classified as a document-type notebook computer, a game-type notebook computer, or a touch-type notebook computer. Users can purchase a specific type of notebook computer to meet individual practical needs. However, today's notebook computers still have some aspects that cannot meet various needs of users.

Therefore, how to design a portable electronic device that can meet various needs of users is a topic nowadays that needs to be discussed and solved.

BRIEF SUMMARY OF THE DISCLOSURE

Accordingly, one objective of the embodiments of the present disclosure is to provide a portable electronic device to solve the above problems.

According to some embodiments of the disclosure, a portable electronic device is provided and includes a first display module, a second display module, a keyboard device, a sensing unit and a control unit. The second display module is pivotally connected to the first display module. The sensing unit is configured to sense a position of the keyboard device relative to the second display module so as to output a sensing signal. The control unit is configured to control a displaying image of the second display module according to the sensing signal.

According to some embodiments, the second display module further includes a housing and a sliding module. The housing has an inner side. The sliding module is disposed within the housing, and the keyboard device is configured to drive the sliding module to move.

According to some embodiments, the sliding module includes a sliding track and a sliding member. The sliding track is disposed in the housing and is parallel to the inner side. The sliding member is disposed on the sliding track, and the sliding member is configured to slide along the sliding track.

According to some embodiments, the second display module further includes a positioning assembly configured to position the sliding module at different positions within the housing.

According to some embodiments, the portable electronic device further includes a limiting structure configured to limit a relative position of the keyboard device and the sliding module.

According to some embodiments, the limiting structure includes a first magnet and a second magnet. The first magnet is disposed on the sliding module. The second magnet corresponds to the first magnet, and the second magnet is disposed on the keyboard device and configured to generate a magnetic attracting force so as to limit the relative position of the keyboard device and the sliding module.

According to some embodiments, the second display module further includes a positioning assembly, and the positioning assembly includes a third magnet and a fourth magnet. The third magnet is disposed on the sliding module. The fourth magnet is disposed on the inner side, and a magnetic attracting force formed between the third magnet and the fourth magnet is weaker than a magnetic attracting force formed between the first magnet and the second magnet.

According to some embodiments, the sensing unit includes at least three position sensing components and a sensed component. The three position sensing components are disposed at different positions in the second display module. The sensed component is disposed on the keyboard device. The position sensing components are configured to sense the sensed component so as to output the sensing signal.

According to some embodiments, the position sensing components are arranged along a direction parallel to the inner side of the second display module, and a distance between two adjacent position sensing components is equal to a distance between another two adjacent position sensing components.

According to some embodiments, the sensing unit includes a light sensor, a thermal sensor, an ultrasonic sensor, or an infrared sensor.

According to some embodiments of the disclosure, a method of controlling an image of a display module is provided. The method can be applied to a portable electronic device having a first display module and a second display module, and the method includes: sensing, by a sensing unit, a position of a keyboard device relative to the second display module, so as to output a sensing signal; determining, by a control unit, whether the keyboard device is located on the second display module according to the sensing signal; and in response to the control unit determining that the keyboard device is located on the second display module, the control unit controlling a displaying image of the second display module.

According to some embodiments, the step of the control unit controlling the displaying image of the second display module further includes: in response to the control unit determining that the keyboard device is located in a first position on the second display module according to the sensing signal, the control unit controlling the first display module and the second display module of the portable electronic device to collectively display an image.

According to some embodiments, the step of the control unit controlling the displaying image of the second display module further includes: in response to the control unit determining that the keyboard device is located in a second position on the second display module according to the sensing signal, the control unit controlling a first portion of the second display module to display a plurality of touching icons and controlling a second portion of the second display module to display a virtual touch pad.

According to some embodiments, the method further includes: determining, by the control unit, whether the virtual touch pad of the second display module receives a touch input; in response to the virtual touch pad receiving the touch input, the control unit obtaining a touch displacement of the touch input on the virtual touch pad according to the touch input; and controlling, by the control unit, the first display module of the portable electronic device to display a displaying image and a cursor according to the touch displacement, and controlling the cursor to move with a corresponding displacement on the displaying image.

According to some embodiments, the step of the control unit controlling the displaying image of the second display module further includes: in response to the control unit determining that the keyboard device is located in a third position on the second display module according to the sensing signal, the control unit controlling the second display module to display a handwriting interface.

According to some embodiments, the step of the control unit controlling the displaying image of the second display module further includes: in response to the control unit determining that the keyboard device is disposed outside the first display module and the second display module of the portable electronic device according to the sensing signal, the control unit controlling the first display module to display a first image and controlling the second display module to display a second image.

According to some embodiments, the method further includes: controlling, by the control unit, the first display module of the portable electronic device to display a displaying image and a cursor, and limiting the cursor to move within a movable range by the control unit.

According to some embodiments, the movable range is defined as a range of the displaying image of the first display module.

According to some embodiments, the step of limiting the cursor to move within the movable range further includes: in response to the portable electronic device being connected to a third display module, the control unit controlling the first display module and a third display module to collectively display an image, and the movable range is defined as a range of the image.

According to some embodiments of the disclosure, a portable electronic device is provided and includes a display module, a keyboard device, a sensing unit and a control unit. The sensing unit is configured to sense a position of the keyboard device relative to the display module to output a sensing signal. The control unit is configured to control a displaying image of the display module according to the sensing signal.

The present disclosure provides a portable electronic device having two displaying screens and the portable electronic device includes a first display module, a second display module, a keyboard device, a sensing unit and a control unit. In some embodiments of the present disclosure, the sensing unit senses the position of the keyboard device relative to the second display module so as to output a sensing signal. The control unit then controls the displaying image of the second display module according to the sensing signal. As a result, when the keyboard device is located in different positions, it can provide the user with different using modes, so as to meet the user's requirements.

In some embodiments, when the keyboard device is located in the first position on the second display module, the control unit can control the upper portion of the second displaying screen to serve as an extended screen of the first displaying screen. In some embodiments, when the keyboard device is located in the second position on the second display module, the control unit can control the upper portion of the second displaying screen to display a plurality of touch icons, and control the lower portion of the second displaying screen to display a virtual touch pad that allows the user to control the cursor. Moreover, in some embodiments, when the keyboard device is located in the third position on the second display module, the control unit can control the lower portion of the second displaying screen to display a handwriting interface that allows the user to write or draw.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Figure 1:
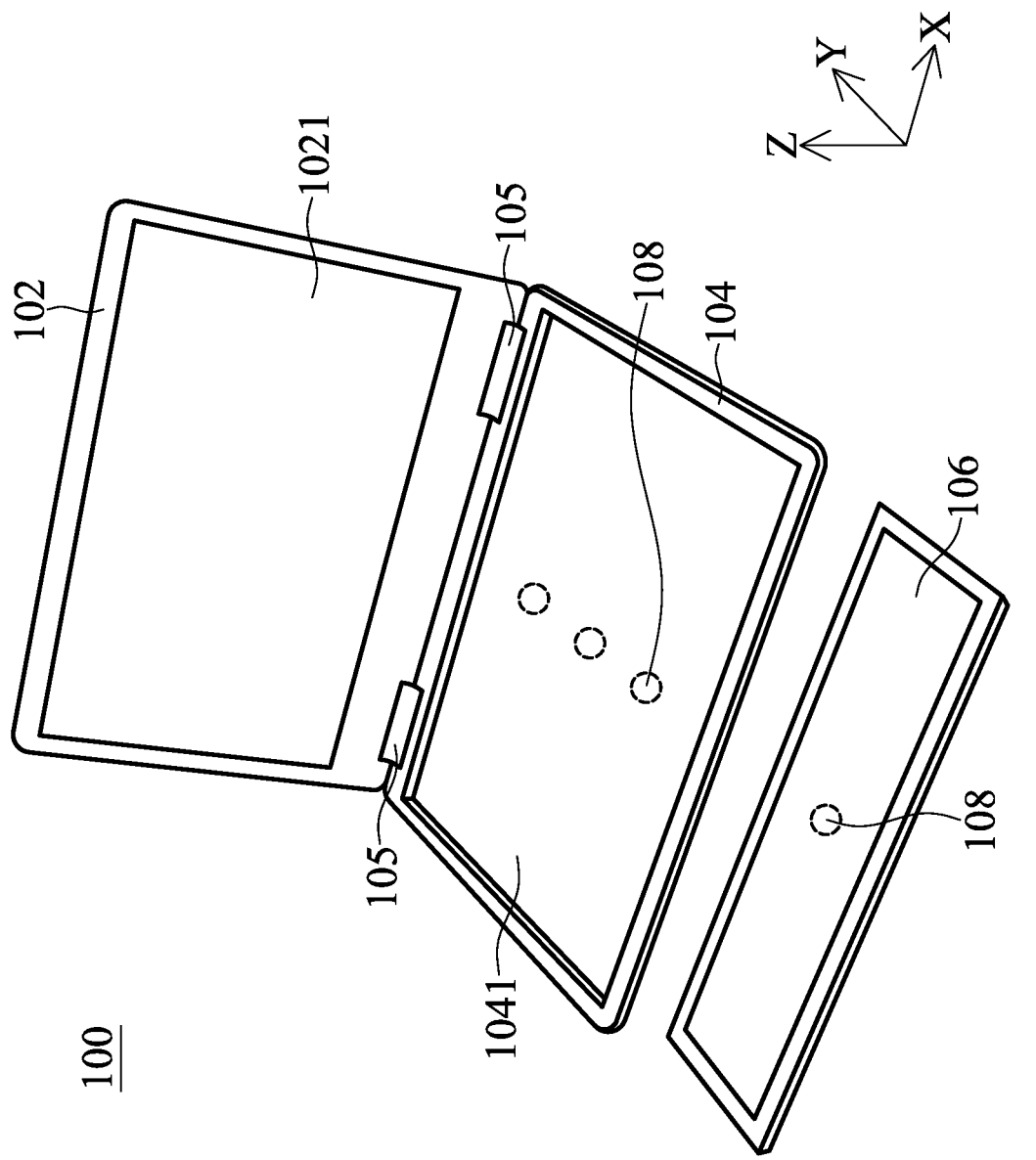
FIG. 1 is a schematic diagram of a portable electronic device according to an embodiment of the present disclosure.

DETAILED DESCRIPTION OF THE
ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
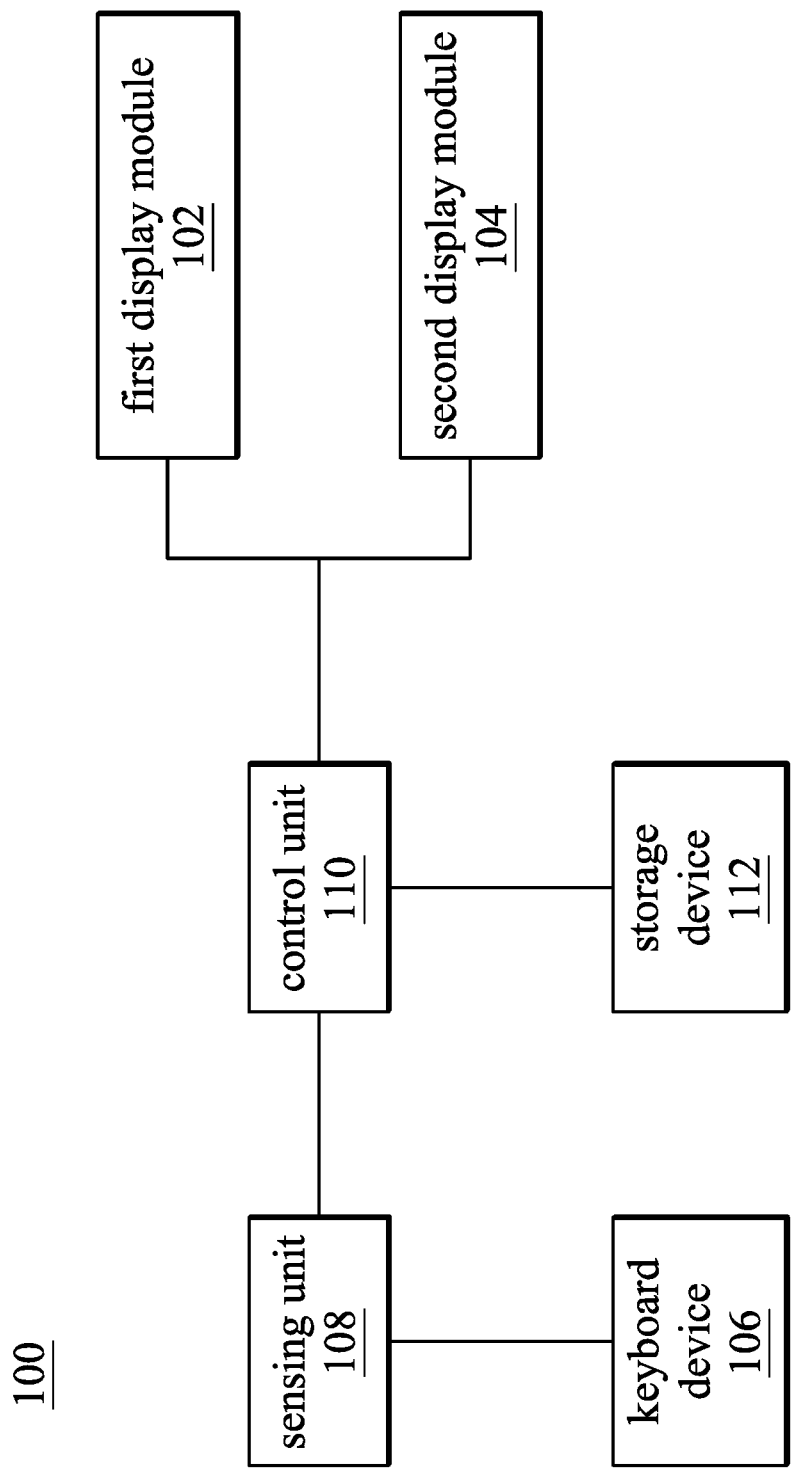
FIG. 2 shows a block diagram of the portable electronic device according to the embodiment of the present disclosure.

Please refer to FIG. 1 and FIG. 2. FIG. 1 is a schematic diagram of a portable electronic device 100 according to an embodiment of the present disclosure, and FIG. 2 shows a block diagram of the portable electronic device 100 according to the embodiment of the present disclosure. In this embodiment, the portable electronic device 100 can be a touch-type notebook computer, including a first display module 102, a second display module 104, a keyboard device 106, a sensing unit 108, and a control unit 110. In this embodiment, both the first display module 102 and the second display module 104 are touch-type display modules, but they are not limited thereto. The first display module 102 is connected to the second display module 104 by a rotating shaft 105, so that the first display module 102 can pivot relative to the second display module 104.

In this embodiment, the keyboard device 106 can be disposed on a second displaying screen 1041 of the second display module 104, and the keyboard device 106 can be moved on the second displaying screen 1041. Moreover, the sensing unit 108 can include a plurality of position sensing components and sensed components. The position sensing components are disposed inside the second display module 104, and the sensed components are disposed on the keyboard device 106. The position sensing components of the sensing unit 108 are configured to sense the position of the keyboard device 106 relative to the second display module 104, so as to output a sensing signal.

Next, the control unit 110 can control the displaying images of the first displaying screen 1021 of the first display module 102 and the second displaying screen 1041 of the second display module 104 according to the obtained sensing signal. In this embodiment, the control unit 110 can be a central processing unit (CPU) configured to control the operation of the portable electronic device 100. The central processing unit provides the processing capability required to execute an operating system (OS), programs, user graphic interface (GUI), software, modules, application, and other functions of the portable electronic device 100.

The central processing unit may include a single processor or it may include a plurality of processors. For example, the central processing unit may include general purpose microprocessors, a combination of general and special purpose microprocessors, such as instruction-set processors, graphics processors, video processors, audio processors and special purpose microprocessors, and/or related chips sets. In addition, in some embodiments, the control unit 110 can also be an embedded controller.

In addition, as shown in FIG. 2, the portable electronic device 100 can further include a storage device 112. The storage device 112 may be non-volatile memory such as read only memory, flash memory, a hard drive, or any other suitable optical, magnetic, or solid-state computer readable media, as well as a combination thereof. The storage device 112 can store an operating system and a plurality of applications for the control unit 110 to execute the operating system and the required applications.

Figure 3:
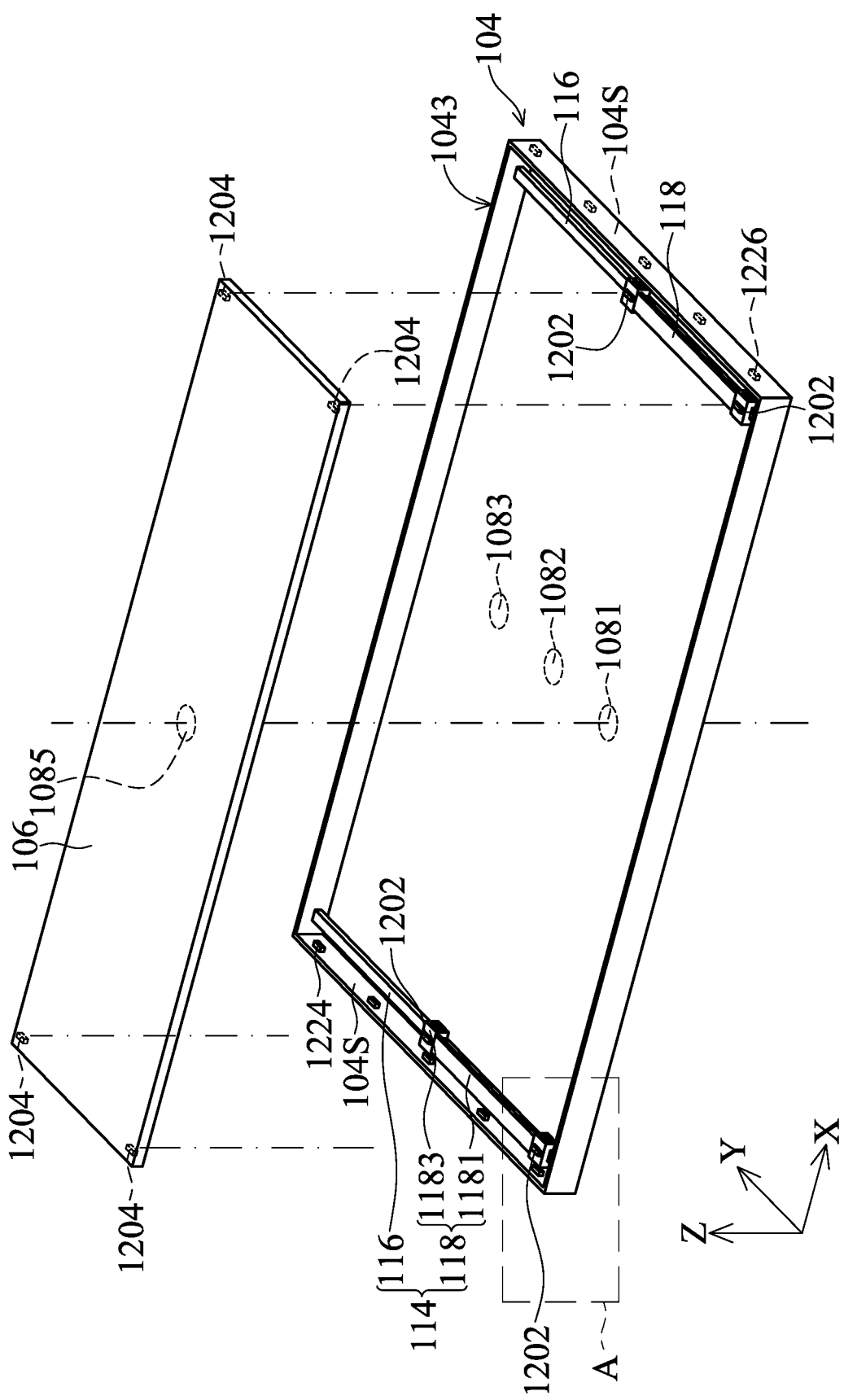
FIG. 3 is a schematic diagram of the second display module and the keyboard device according to the embodiment of the present disclosure.
Figure 4:
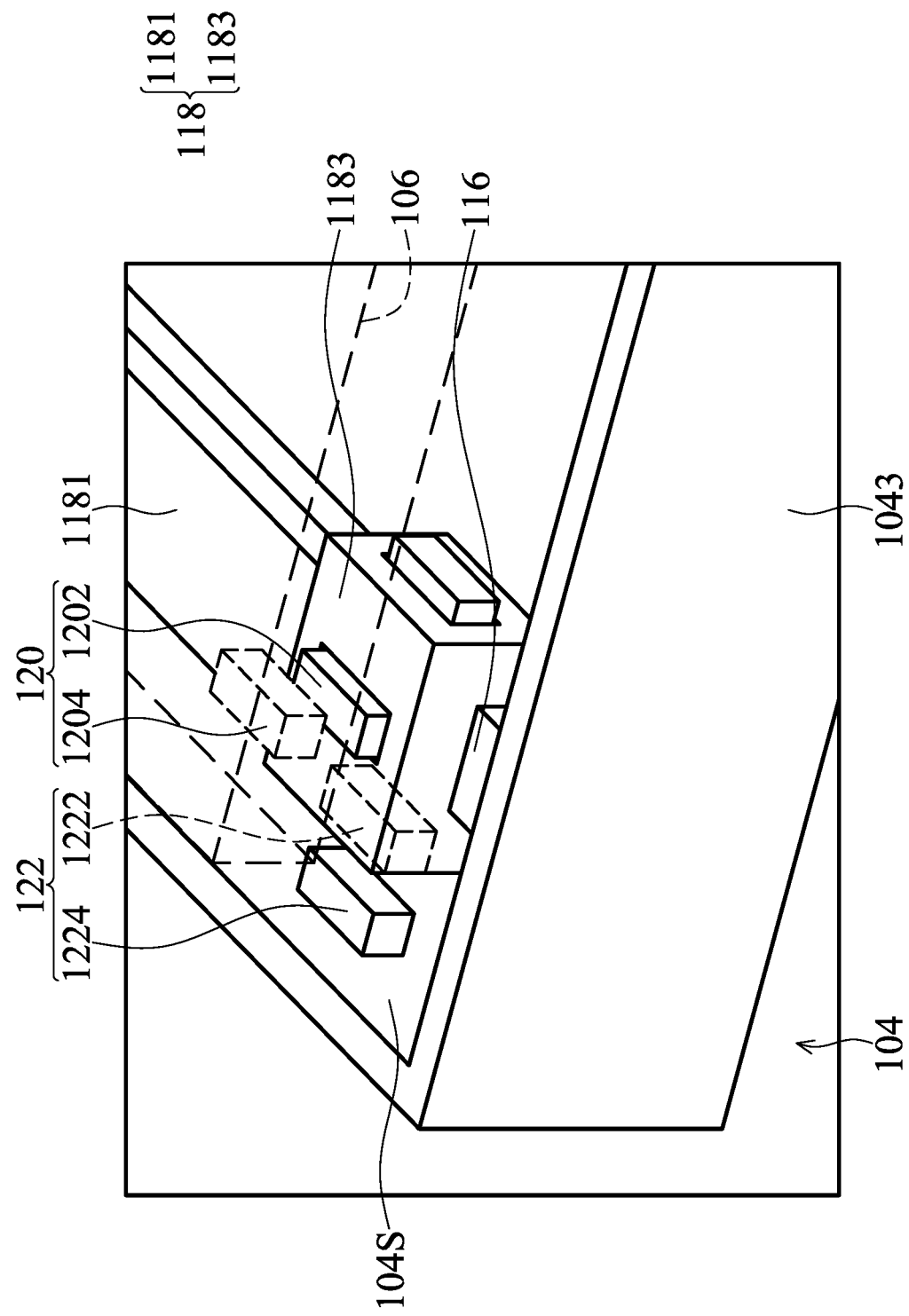
FIG. 4 shows a partial enlarged diagram of the area A in FIG. 3 according to the embodiment of the present disclosure.

Please refer to FIG. 3 and FIG. 4. FIG. 3 is a schematic diagram of the second display module 104 and the keyboard device 106 according to the embodiment of the present disclosure, and FIG. 4 is a partial enlarged diagram of the area A in FIG. 3 according to the embodiment of the present disclosure. In order to clearly show the internal structure of the second display module 104, the second displaying screen 1041 is omitted in FIG. 3 and FIG. 4.

As shown in FIG. 3, the second display module 104 can include a housing 1043 and a sliding module 114. The housing 1043 has two opposing inner sides 104S, and the sliding module 114 is disposed within the housing 1043 and is adjacent to the inner side 104S. In this embodiment, the keyboard device 106 is configured to drive the sliding module 114 to move along the Y-axis direction.

In this embodiment, the sliding module 114 may include two sliding tracks 116 and two sliding members 118. However, the number of the sliding tracks 116 and the sliding members 118 is not limited to this embodiment. The sliding tracks 116 are disposed in the housing 1043 and are parallel to the inner sides 104S. In addition, the two sliding members 118 are respectively disposed on the sliding tracks 116 such that the sliding members 118 are configured to slide along the two sliding tracks 116. In addition, the sliding member 118 may include a connecting portion 1181 and two sliding portions 1183, and the two sliding portions 1183 are connected to each other by the connecting portion 1181. It should be noted that in some embodiments, the sliding members 118 may also include only one sliding portion 1183.

Furthermore, the portable electronic device 100 can further include a limiting structure 120 configured to limit the relative position of the keyboard device 106 and the sliding module 114. Specifically, in this embodiment, the limiting structure 120 includes four first magnets 1202 and four second magnets 1204. The first magnet 1202 is disposed on the sliding member 118 of the sliding module 114. The second magnet 1204 corresponds to the first magnet 1202, and the second magnet 1204 is disposed on the bottom surface of the keyboard device 106.

When the keyboard device 106 is placed on the second display module 104, the first magnets 1202 and the second magnets 1204 are configured to generate a magnetic attracting force so as to limit the relative position of the keyboard device 106 and the sliding module 114. That is, the keyboard device 106 can be attached to a first position above the sliding module 114 (FIG. 3), and the keyboard device 106 can drive the sliding module 114 to move along the Y-axis direction. It should be noted that the number of the first magnets 1202 and the second magnets 1204 in the limiting structure 120 is not limited to this embodiment.

In addition, in other embodiments, the limiting structure 120 can also include an engaging slot and an engaging member which are respectively disposed on the keyboard device 106 and the sliding module 114 so that the keyboard device 106 is connected to the sliding module 114. The limiting structure 120 is not limited to the first magnet 1202, the second magnet 1204, the engaging slot or the engaging member, and any structure or component that can limit the relative position of the keyboard device 106 and the sliding module 114 is within the scope of the present disclosure.

Furthermore, as shown in FIG. 4, the second display module 104 can further include a positioning assembly 122 configured to position the sliding module 114 at different positions within the housing 1043. Specifically, the positioning assembly 122 includes a plurality of third magnets 1222 and a plurality of fourth magnets. The third magnets 1222 are disposed on the sliding portions 1183, and the fourth magnets are disposed on the inner sides 104S. In this embodiment, the positioning assembly 122 can include five fourth magnets 1224 and five fourth magnets 1226. The fourth magnets 1224 and the fourth magnets 1226 are respectively disposed on the two inner sides 104S.

Figure 5:
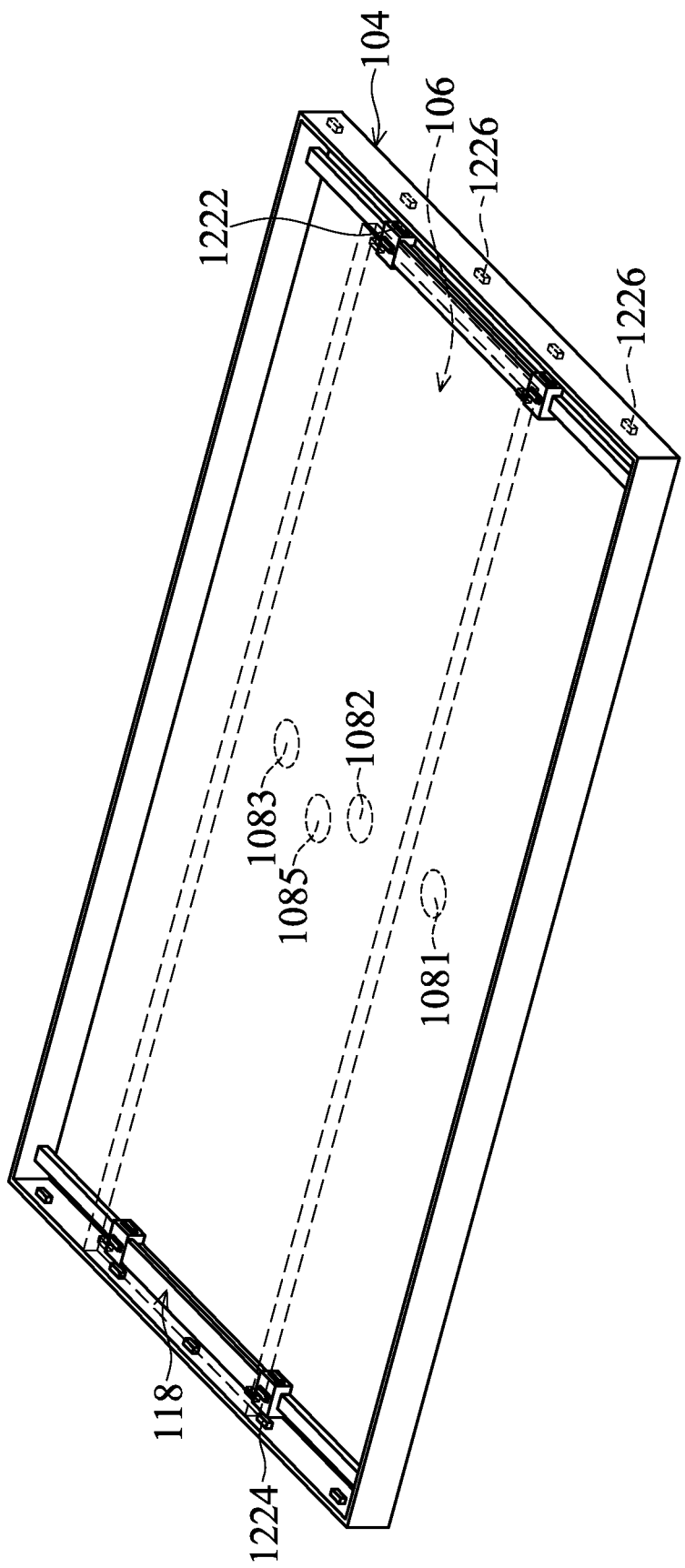
FIG. 5 is a schematic diagram illustrating that the keyboard device is located in a second position on the second display module according to the embodiment of the present disclosure.

When the keyboard device 106 is disposed on the second display module 104 and is provided with a driving force along the Y-axis direction, as shown in FIG. 4, the third magnet 1222 on the sliding portion 1183 can be separated from the four magnet 1224, so that the keyboard device 106 can drive the two sliding members 118 along the Y-axis direction to arrive at the position as shown in FIG. 5. FIG. 5 is a schematic diagram illustrating that the keyboard device 106 is located in a second position on the second display module 104 according to the embodiment of the present disclosure. When the sliding members 118 is moved to the second position, the third magnets 1222 on the sliding members 118 are attracted by the corresponding two fourth magnets 1224 and the two fourth magnets 1226 so as to be fixed in the second position.

Figure 6:
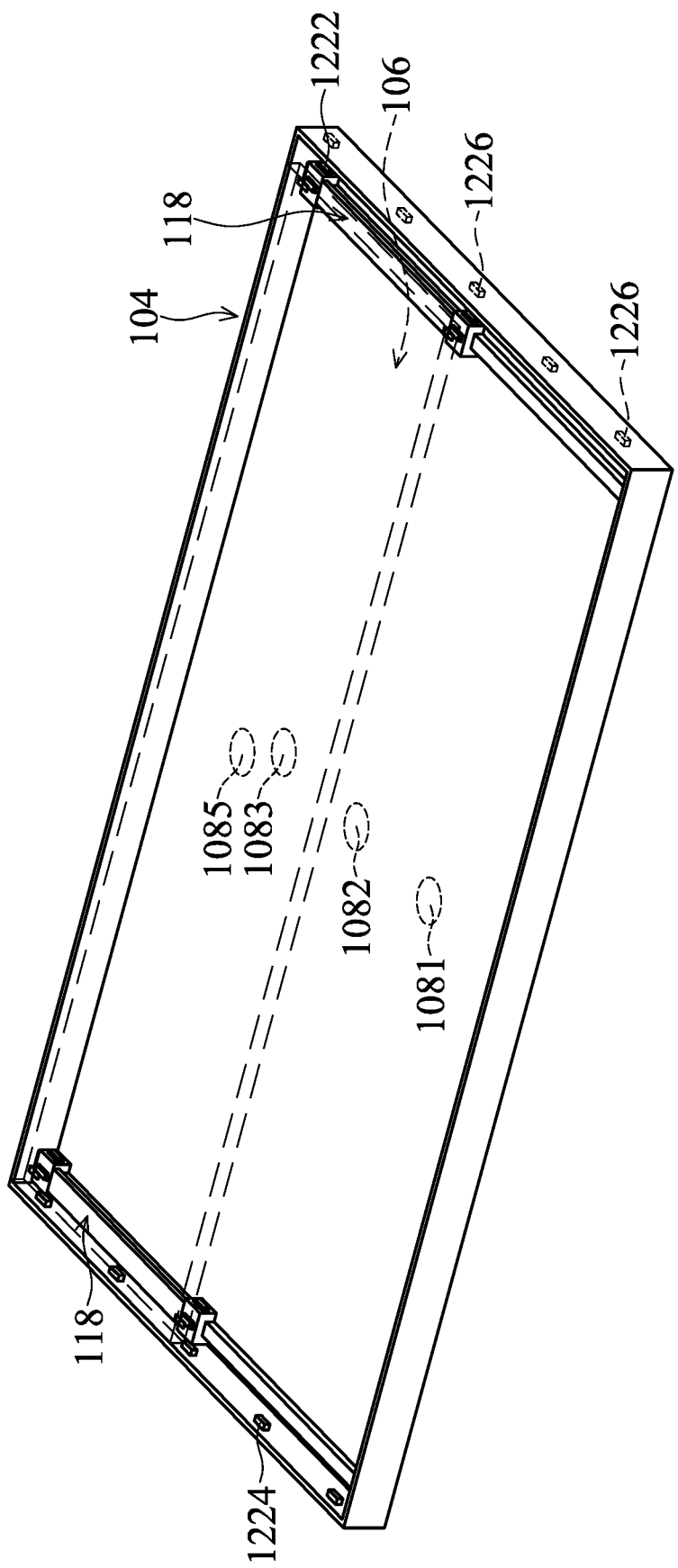
FIG. 6 is a schematic diagram illustrating that the keyboard device is located in a third position on the second display module according to the embodiment of the present disclosure.

Furthermore, when the keyboard device 106 continues to be provided with a driving force along the Y-axis direction, the keyboard device 106 can further drive the two sliding members 118 to move to arrive at the position as shown in FIG. 6. FIG. 6 is a schematic diagram illustrating that the keyboard device 106 is located in a third position on the second display module 104 according to the embodiment of the present disclosure. It should be noted that, in this embodiment, the magnetic attracting force formed between the third magnets 1222 and the fourth magnets 1224, 1226 is weaker than the magnetic attracting force formed between the first magnet 1202 and the second magnet 1204, so as to ensure that the keyboard device 106 is not separated from the second display module 104 during movement.

Furthermore, as shown in FIG. 3, FIG. 5, and FIG. 6, the sensing unit 108 can include three position sensing components 1081, 1082 and 1083 and a sensed component 1085. The position sensing components 1081, 1082 and 1083 are disposed at different positions in the second display module 104, and the sensed component 1085 is disposed on the bottom surface of the keyboard device 106. These position sensing components are arranged along a direction (the Y-axis direction) parallel to the inner side 104S of the second display module 104, and the distance between two adjacent position sensing components is equal. These position sensing components are configured to sense the position of the keyboard device 106 so as to output the aforementioned sensing signal. For example, as shown in FIG. 6, when the keyboard device 106 moves to the third position, the position sensing component 1083 senses the sensed component 1085 and outputs the sensing signal to the control unit 110.

In this embodiment, the position sensing components 1081, 1082 and 1083 can be a Hall sensor, and the sensed component 1085 can be a Hall magnet, but they are not limited to this embodiment. For example, the sensing component in the sensing unit 108 can also include a light sensor, a thermal sensor, an ultrasonic sensor, or an infrared sensor.

In addition, it should be noted that the position sensing components 1081, 1082, and 1083 can also be integrated with the fourth magnet 1224 or the fourth magnet 1226, and the third magnet 1222 can serve as a sensed component. Because there is no relative movement between the position sensing component and the fourth magnet at this time, the position sensing component does not sense the variation of the magnetic field of the fourth magnet but can sense the variation of the magnetic field of the third magnet 1222. Based on this configuration, the manufacturing costs of the portable electronic device 100 can be reduced and the available mechanical space inside the portable electronic device 100 can be increased.

Figure 7:
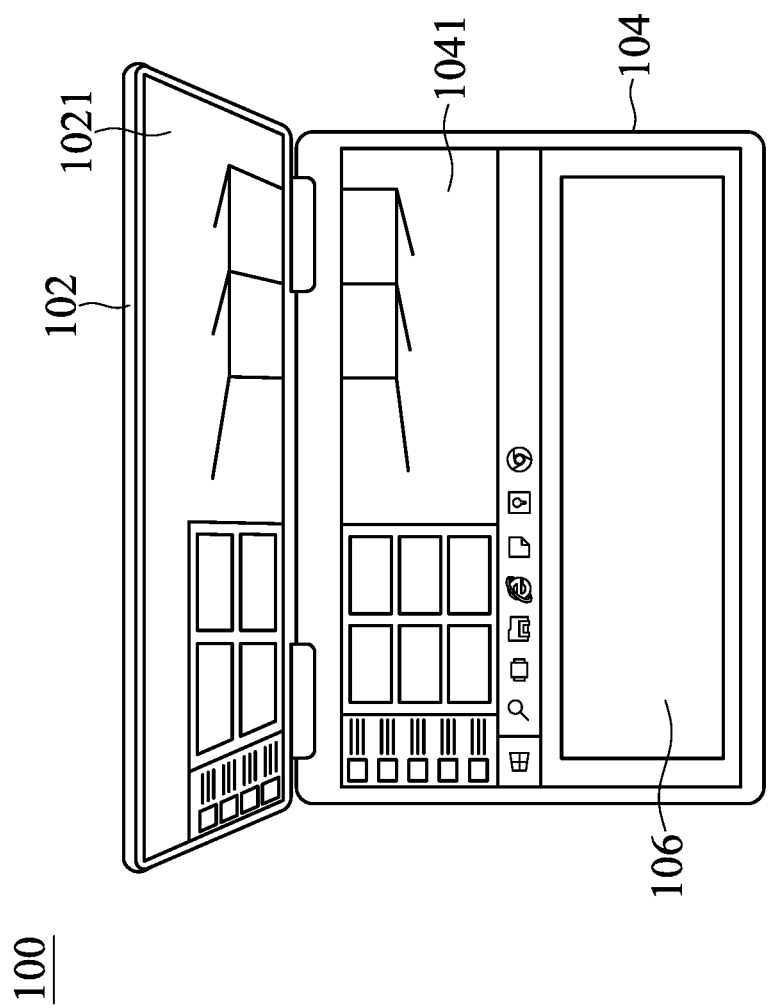
FIG. 7 is a diagram illustrating a state of use of the keyboard device at the first position according to an embodiment of the present disclosure.

Please refer to FIG. 7, which is a diagram illustrating a state of use of the keyboard device 106 at the first position according to an embodiment of the present disclosure. As shown in FIG. 7, when the control unit 110 determines that the keyboard device 106 is located in the first position on the second display module 104 according to the sensing signal from the sensing unit 108, the control unit 110 can control the second displaying screen 1041 of second display module 104 to display a particular image. For example, the control unit 110 can control the upper portion of the second displaying screen 1041 and the first displaying screen 1021 of the first display module 102 to display an image together.

That is, the upper portion of the second displaying screen 1041 can serve as an extended screen of the first displaying screen 1021.

Furthermore, the control unit 110 can also control the second displaying screen 1041 to display other images. For example, the control unit 110 can control the upper portion of the second displaying screen 1041 to display a handwriting interface that allows the user to write or draw.

Figure 8:
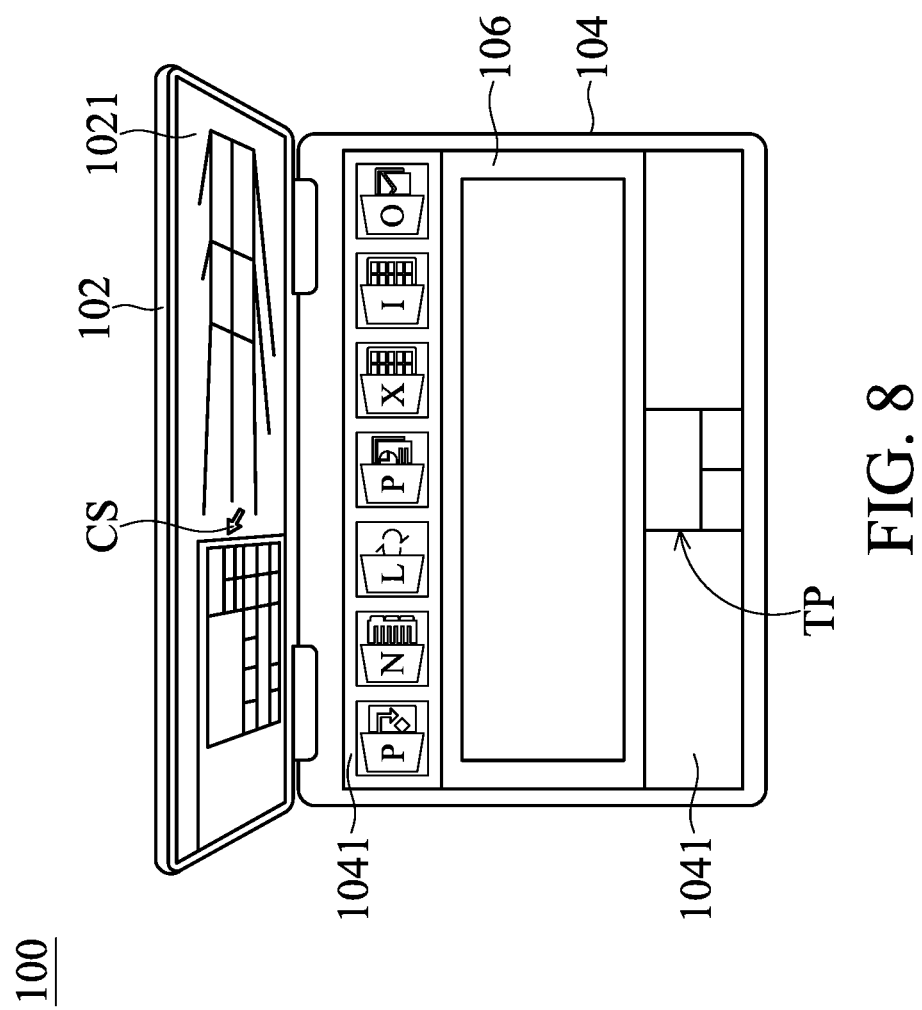
FIG. 8 is a diagram illustrating a state of use of the keyboard device at the second position according to an embodiment of the present disclosure.

Please refer to FIG. 8, which is a diagram illustrating a state of use of the keyboard device 106 at the second position according to an embodiment of the present disclosure. As shown in FIG. 8, when the keyboard device 106 is moved from the first position in FIG. 7 to the second position, the control unit 110 can determine that the keyboard device 106 is located in the second position on the second display module 104 according to the sensing signal from the sensing unit 108. Then, the control unit 110 can change the image of the second displaying screen 1041 of the second display module 104. For example, the control unit 110 can control the upper portion (the first portion) of the second displaying screen 1041 to display a plurality of touch icons for providing the user to touch and select, and the control unit 110 controls the lower portion (the second portion) of the second displaying screen 1041 to display a virtual touch pad TP that allows the user to control a cursor CS.

In this embodiment, the image (also referred to as the displaying image mentioned before) displayed on the first displaying screen 1021 is different from the image displayed on the second displaying screen 1041. For example, the desktop of the operating system can be displayed on the first displaying screen 1021.

Figure 9:
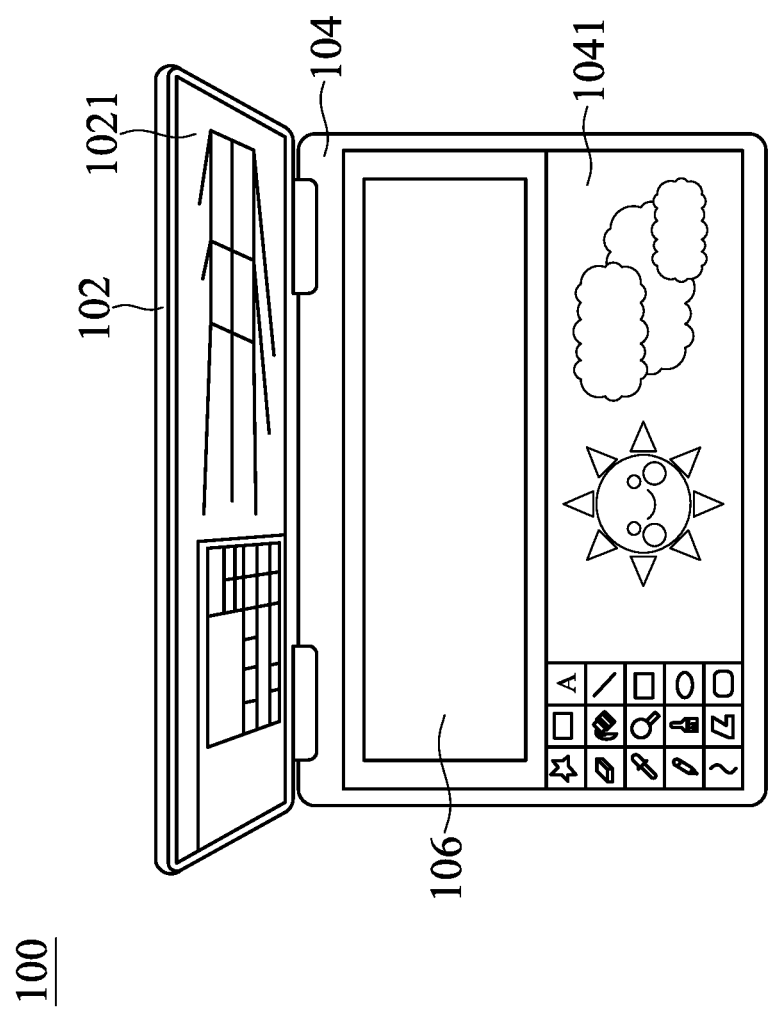
FIG. 9 is a diagram illustrating a state of use of the keyboard device at the third position according to an embodiment of the present disclosure.

Please refer to FIG. 9, which is a diagram illustrating a state of use of the keyboard device 106 at the third position according to an embodiment of the present disclosure. As shown in FIG. 9, when the keyboard device 106 is moved from the second position in FIG. 8 to the third position, the control unit 110 can determine that the keyboard device 106 is located in the third position on the second display module 104 according to the sensing signal from the sensing unit 108. Then, the control unit 110 can change the image displayed on the second displaying screen 1041 of the second display module 104. For example, the control unit 110 can control the lower portion of the second displaying screen 1041 to display a handwriting interface that allows the user to write or draw.

Figure 10:
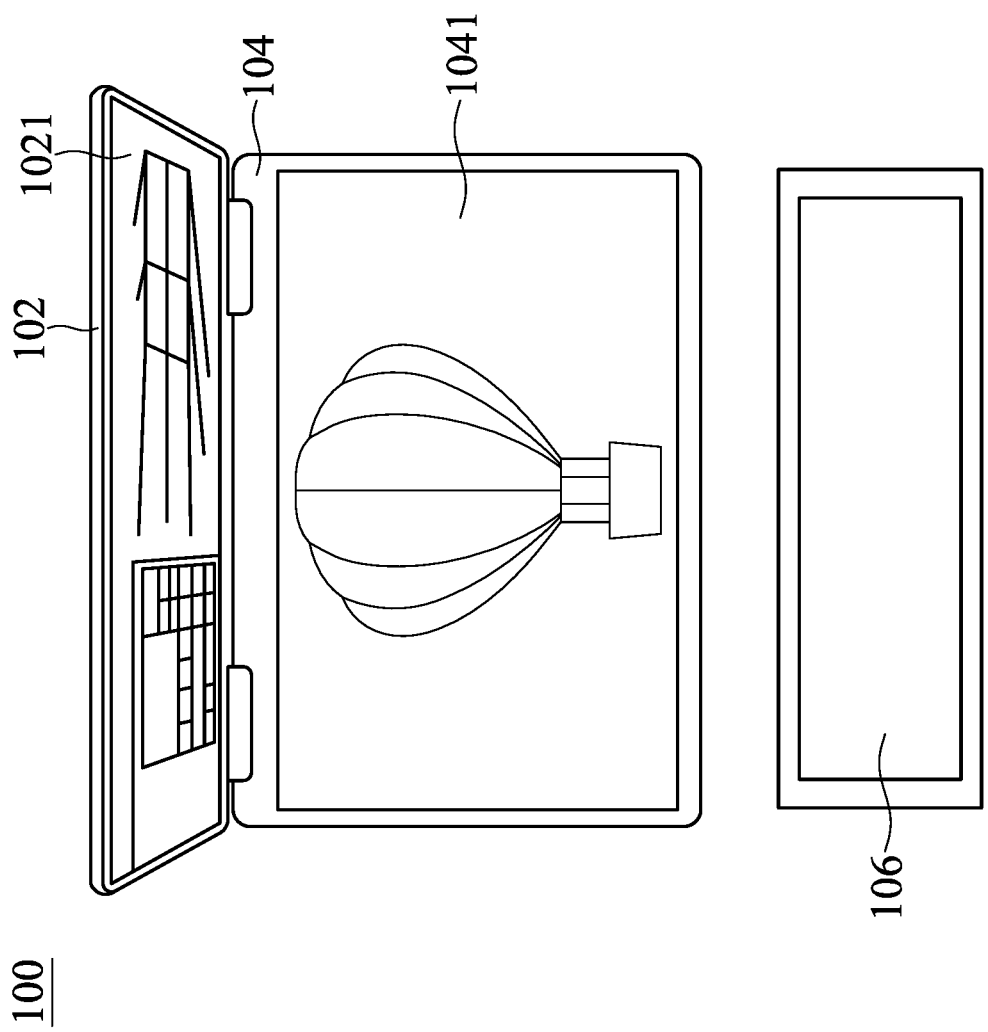
FIG. 10 is a diagram illustrating a state of use of the keyboard device when the keyboard device is outside the second display module according to an embodiment of the present disclosure.

Please refer to FIG. 10, which is a diagram illustrating a state of use of the keyboard device 106 when the keyboard device 106 is outside the second display module 104 according to an embodiment of the present disclosure. When the control unit 110 determines that the keyboard device 106 is disposed outside the first display module 102 and the second display module 104 of the portable electronic device 100 according the sensing signal, the control unit 110 can control the first displaying screen 1021 to display a first image and control the second displaying screen 1041 to display a second image. Therefore, the user can run different applications on the first display module 102 and the second display module 104.

Figure 11:
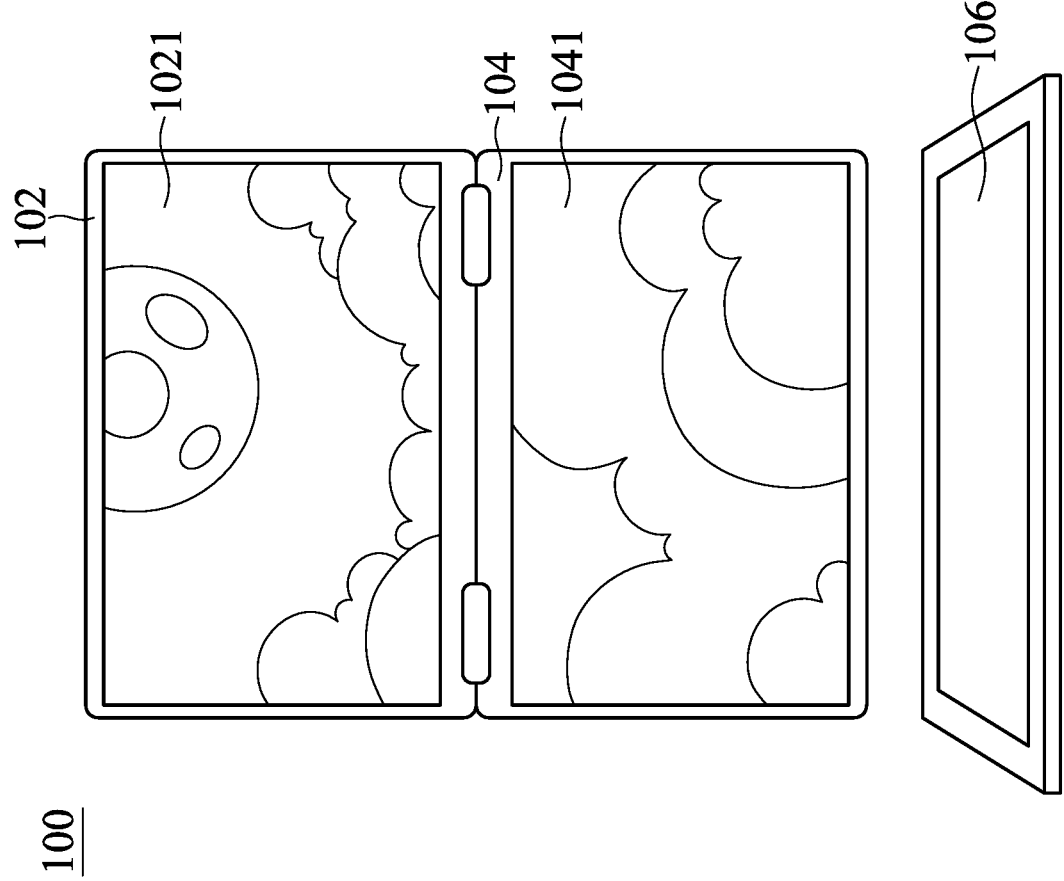
FIG. 11 and FIG. 12 show diagrams illustrating a state of use of the keyboard device when the keyboard device is outside the second display module according to another embodiment of the present disclosure.
Figure 12:
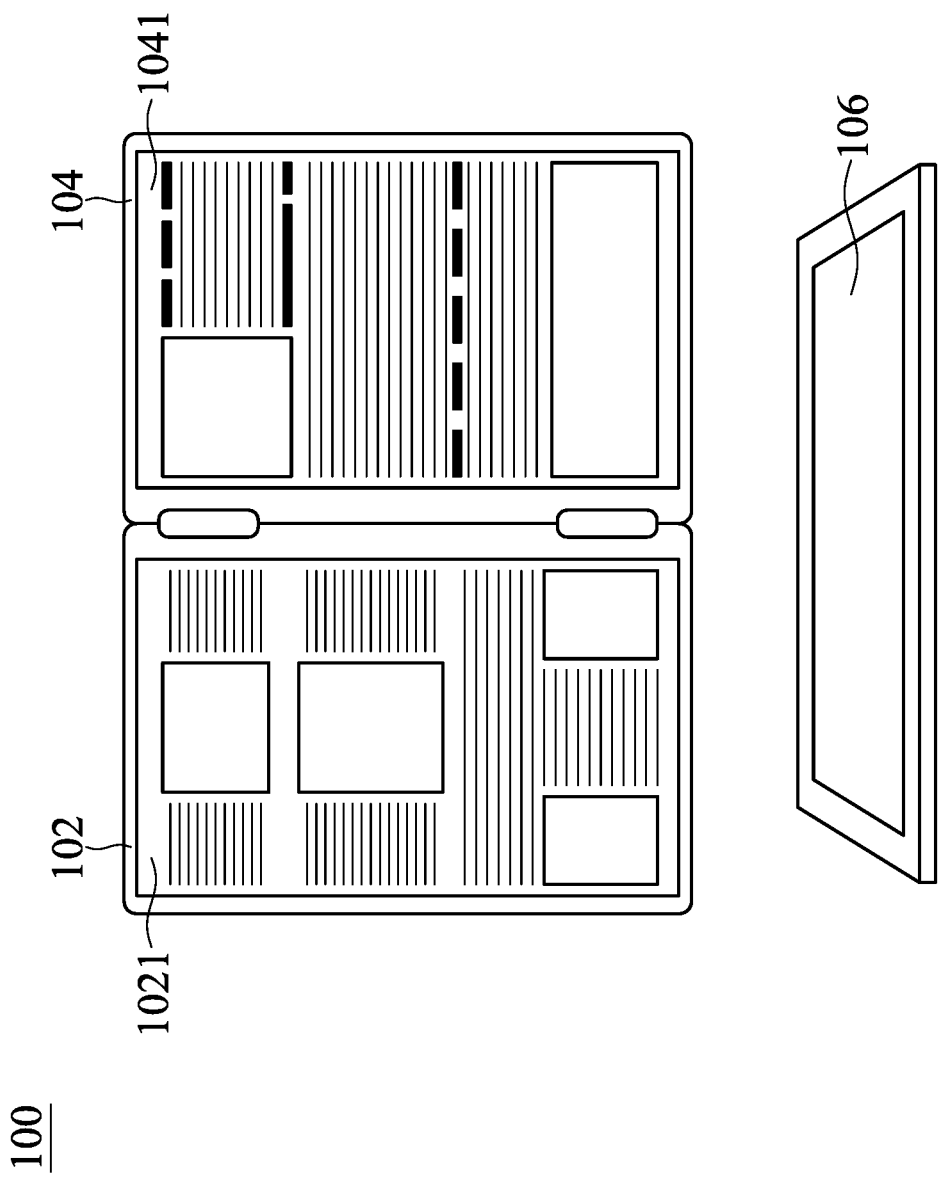

Please refer to FIG. 11 and FIG. 12, which are diagrams illustrating a state of use of the keyboard device 106 when the keyboard device 106 is outside the second display module 104 according to another embodiment of the present disclosure. As shown in FIG. 11, the keyboard device 106 is disposed outside the portable electronic device 100, and the portable electronic device 100 can be unfolded to place on a desktop. At this time, the control unit 110 can control the first displaying screen 1021 and the second displaying screen 1041 to display an image together according to a signal of another sensor (for example, a gravity sensor).

In addition, as shown in FIG. 12, the keyboard device 106 is disposed outside the portable electronic device 100, and the portable electronic device 100 is horizontally disposed on the desktop. At this time, the control unit 110 can rotate the images displayed on the first displaying screen 1021 and the second displaying screen 1041 according to the signal of the gravity sensor. In this embodiment, the portable electronic device 100 operates in a reading mode, and it displays the contents of a book or a file on the first displaying screen 1021 and the second displaying screen 1041 that allows the user to read.

Figure 13:
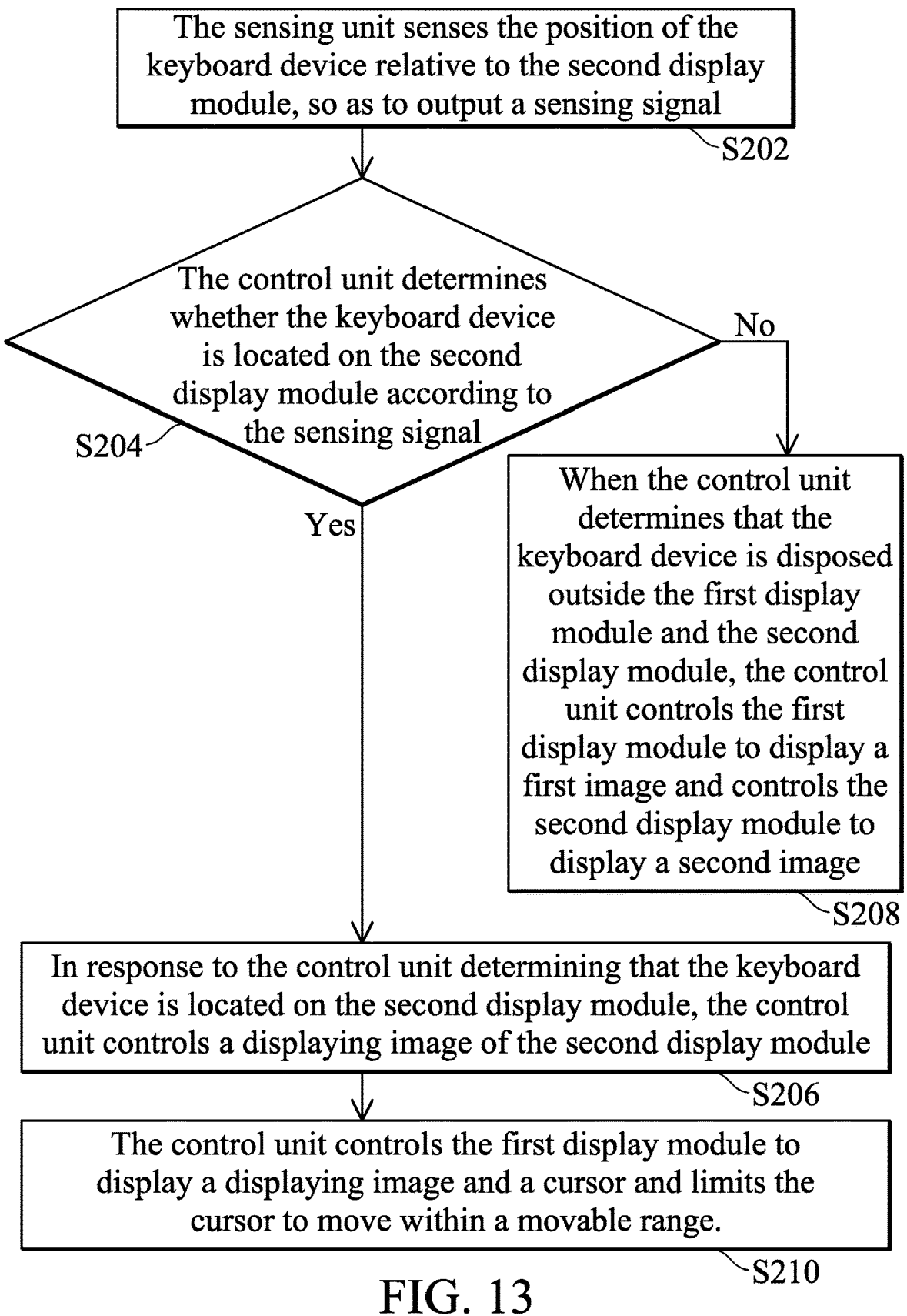
FIG. 13 shows a flowchart of a method of controlling an image of a display module according to an embodiment of the present disclosure.

Please refer to FIG. 13, which shows a flowchart of a method 200 of controlling an image of a display module according to an embodiment of the present disclosure. In step S202, the sensing unit 108 senses the position of the keyboard device 106 relative to the second display module 104 of the portable electronic device 100, so as to output a sensing signal. Next, in step S204, the control unit 110 determines whether the keyboard device 106 is located on the second display module 104 according to the sensing signal.

When the control unit 110 determines that the keyboard device 106 is located on the second display module 104, step S206 is performed, and when the control unit 110 determines that the keyboard device 106 is not located on the second display module 104, step S208 is performed.

In step S206, in response to the control unit 110 determining that the keyboard device 106 is located on the second display module 104, the control unit 110 controls a displaying image of the second display module 104. For example, when the control unit 110 determines that the keyboard device 106 is located in the first position on the second display module 104 according to the sensing signal, the control unit 110 controls the first display module 102 and the second display module 104 of the portable electronic device 100 to collectively display an image.

When the control unit 110 determines that the keyboard device 106 is located in the second position on the second display module 104 according to the sensing signal, the control unit 110 controls the first portion of the second display module 104 to display a plurality of touching icons and controls the second portion of the second display module 104 to display a virtual touch pad (such as the virtual touch pad TP in FIG. 8).

In addition, when the control unit 110 determines that the keyboard device 106 is located in the third position on the second display module 104 according to the sensing signal, the control unit 110 controls the second display module 104 to display a handwriting interface.

In step S208, when the control unit 110 determines that the keyboard device 106 is disposed outside the first display module 102 and the second display module 104 of the portable electronic device 100 according to the sensing signal, the control unit 110 controls the first display module 102 to display a first image and controls the second display module 104 to display a second image. For example, as shown in FIG. 10, the user can perform different applications on the first display module 102 and the second display module 104.

In step S210, the control unit 110 can control the first display module 102 of the portable electronic device 100 to display a displaying image and a cursor (such as the cursor CS in FIG. 8), and the control unit 110 limits the cursor CS to move within a movable range. In this embodiment, the aforementioned movable range is defined as the range of the displaying image of the first display module 102. That is, when the user performs a touch operation on the second display module 104, the cursor CS does not move to the second displaying screen 1041 of the second display module 104.

Figure 14:
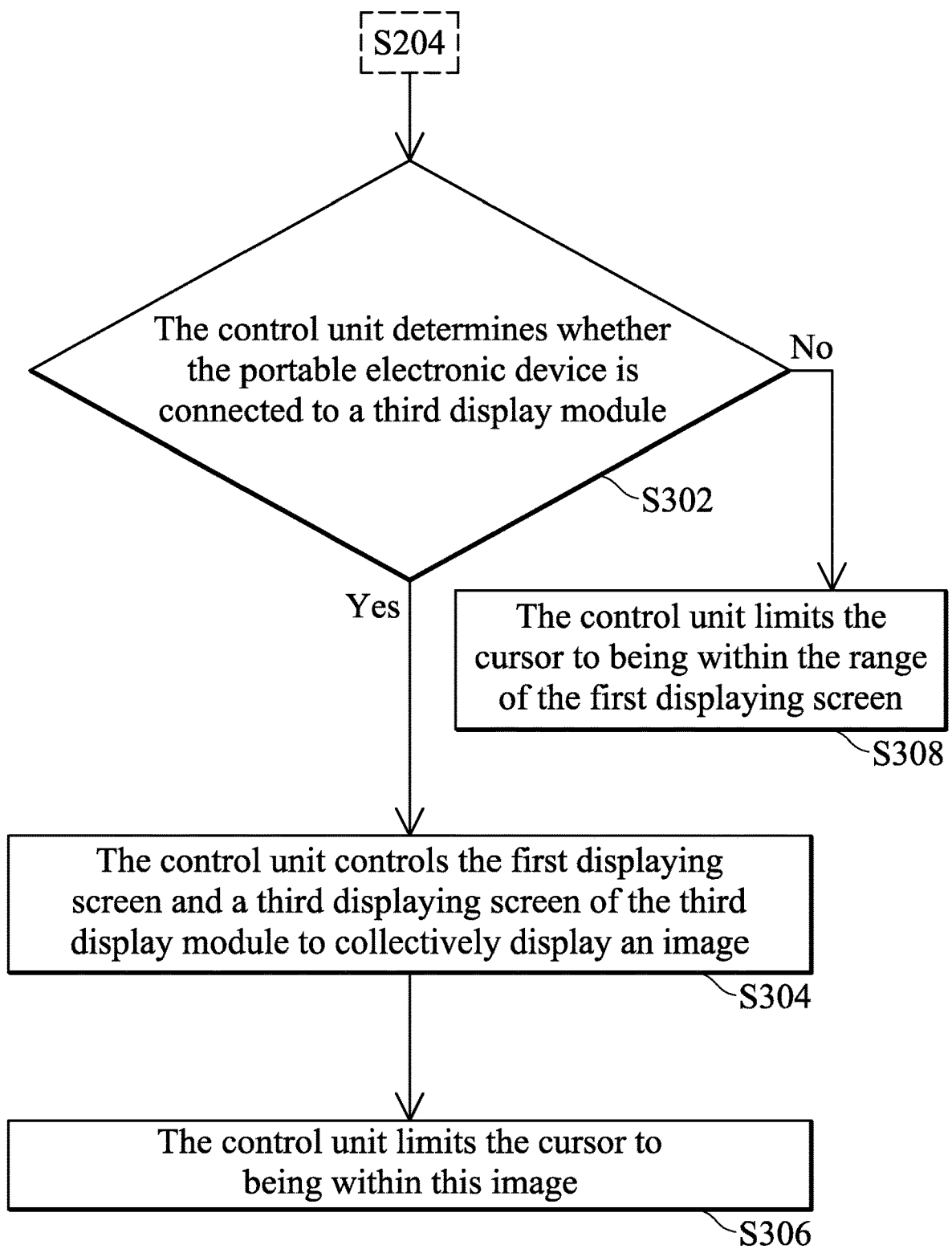
FIG. 14 shows a flowchart for controlling a displaying screen of the portable electronic device according to an embodiment of the present disclosure.

Please refer to FIG. 14, which shows a flowchart for controlling a displaying screen of the portable electronic device 100 according to an embodiment of the present disclosure. It should be noted that the steps of FIG. 14 can also be performed in the embodiment in FIG. 13. For example, when the keyboard device 106 is disposed on the second display module 104. That is, when the result of determination in step S204 is YES, those steps can be performed after step S204.

In this embodiment, as shown in FIG. 14, in step S302, the control unit 110 determines whether the portable electronic device 100 is connected to a third display module (for example, an external monitor). When the portable electronic device 100 is connected to the third display module, step S304 is performed, and when the portable electronic device 100 is not connected to the third display module, step S308 is performed.

In step S304, the control unit 110 can control the first displaying screen 1021 of the first display module 102 and a third displaying screen of the third display module to collectively display an image. Furthermore, the control unit 110 can further obtain the size of the image.

Next, in step S306, the control unit 110 may define the aforementioned movable range according to the size of the image. That is, the movable range may be the range of the image. Therefore, the control unit 110 limits the cursor CS to being within this image such that the cursor CS can only move within the range of the first displaying screen 1021 and the third displaying screen without moving to the second displaying screen 1041.

In addition, in step S308, the movable range is only the range of the first displaying screen 1021 of the first display module 102. Therefore, the control unit 110 limits the cursor CS to being within the range of the first displaying screen 1021 of the first display module 102.

Figure 15:
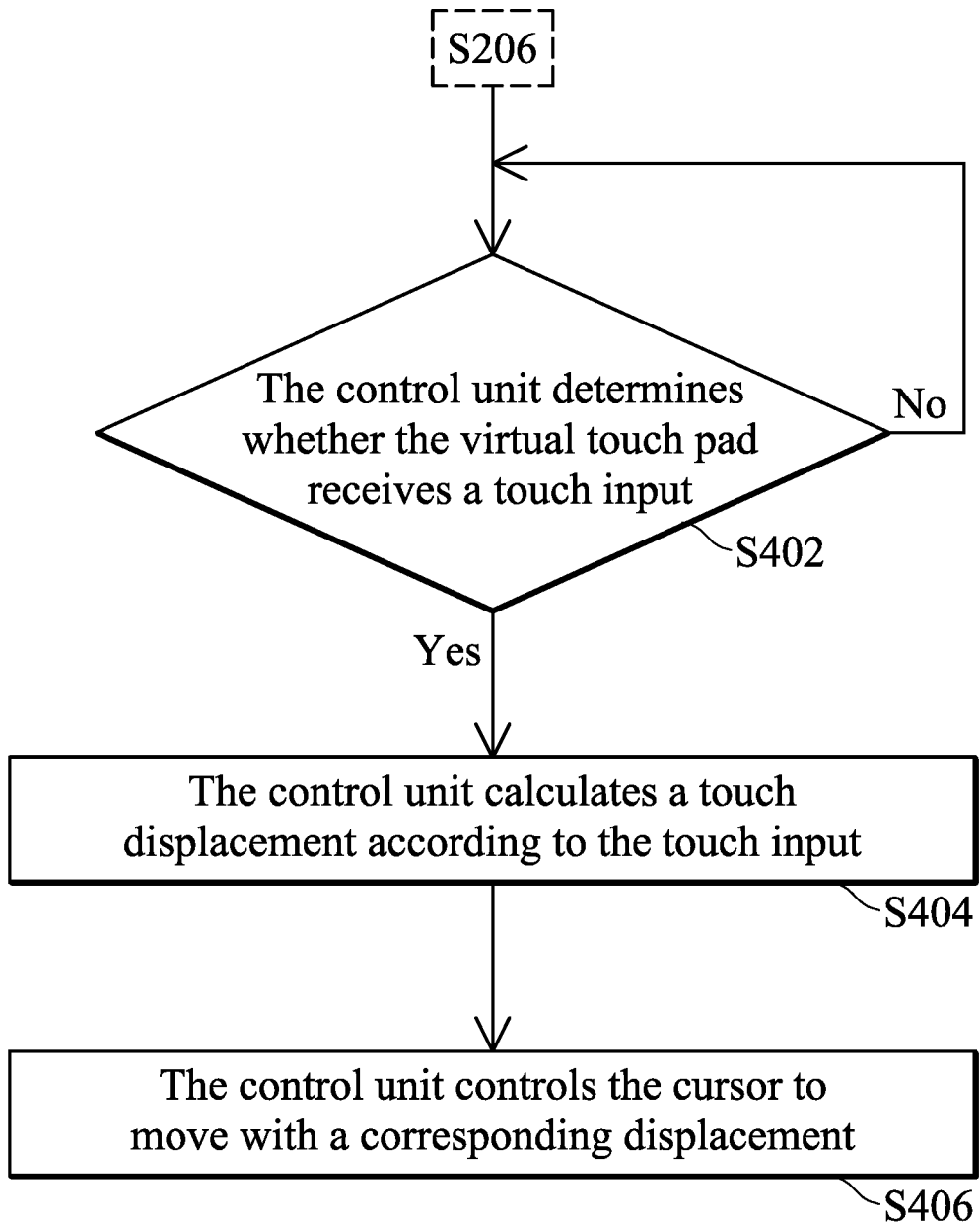
FIG. 15 shows a flowchart for controlling the cursor according to an embodiment of the present disclosure.

Next, please refer to FIG. 15, which is a flowchart for controlling the cursor CS according to an embodiment of the present disclosure. It should be noted that the steps in FIG. 15 can also be performed in the embodiment in FIG. 13. For example, they can be performed after step S206.

In this embodiment, as shown in FIG. 15, in step S402, the control unit 110 determines whether the virtual touch pad TP displayed on the second display module 104 receives a touch input. When it is determined that the virtual touch pad TP of the second display module 104 receives a touch input, step S404 is performed, and when it is determined that the virtual touch pad TP of the second display module 104 does not receive the touch input, the method returns to Step S402.

In step S404, when the virtual touch pad TP receives a touch input, the control unit 110 may calculate a touch displacement of the touch input on the virtual touch pad TP according to the touch input.

Next, in step S406, the control unit 110 can control the cursor CS to move with a corresponding displacement on the first displaying screen 1021 of the first display module 102 of the portable electronic device 100 according to the touch displacement. In addition, it should be noted that if the user's finger moves beyond the range of the virtual touch pad TP, the excess displacement of the finger is not taken into account by the control unit 110 when calculating the touch displacement.

It should be noted that the order in which the steps illustrated in FIG. 13 to FIG. 15 are performed is not limited to this embodiment.

Figure 16:
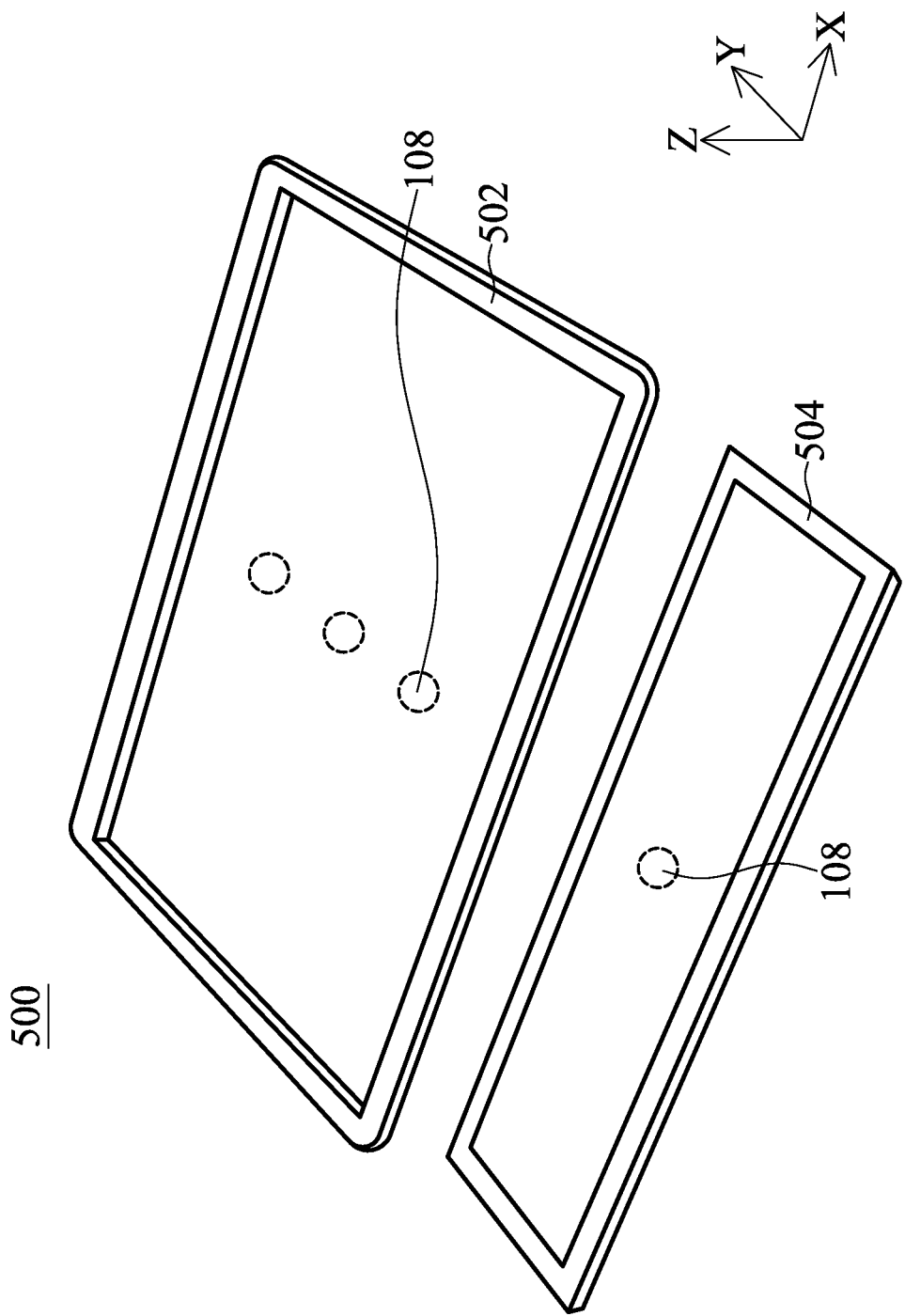
FIG. 16 is a schematic diagram of a portable electronic device according to another embodiment of the present disclosure.

Please refer to FIG. 16, which is a schematic diagram of a portable electronic device 500 according to another embodiment of the present disclosure. The portable electronic device 500 has similar structures to the portable electronic device 100. The difference between these two devices is that the portable electronic device 500 has only one display module 502 and one keyboard device 504. The display module 502 is similar to the second display module 104, and the keyboard device 504 is similar to the keyboard device 106. The method of controlling the display module 502 using the control unit in the portable electronic device 500 is similar to the method in the foregoing embodiment, and therefore it is omitted herein.

In conclusion, the present disclosure provides a portable electronic device having two displaying screens and the portable electronic device includes a first display module 102, a second display module 104, a keyboard device 106, a sensing unit 108 and a control unit 110. In some embodiments of the present disclosure, the sensing unit 108 senses the position of the keyboard device 106 relative to the second display module 104 so as to output a sensing signal. The control unit 110 then controls the displaying image of the second display module 104 according to the sensing signal. As a result, when the keyboard device 106 is located in different positions, it can provide the user with different using modes, so as to meet the user's requirements.

In some embodiments, when the keyboard device 106 is located in the first position on the second display module 104, the control unit 110 can control the upper portion of the second displaying screen 1041 to serve as an extended screen of the first displaying screen 1021. In some embodiments, when the keyboard device 106 is located in the second position on the second display module 104, the control unit 110 can control the upper portion of the second displaying screen 1041 to display a plurality of touch icons, and control the lower portion of the second displaying screen 1041 to display a virtual touch pad TP that allows the user to control the cursor CS. Moreover, in some embodiments, when the keyboard device 106 is located in the third position on the second display module 104, the control unit 110 can control the lower portion of the second displaying screen 1041 to display a handwriting interface that allows the user to write or draw.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A portable electronic device, comprising:
   a first display module;
   a second display module, pivotally connected to the first display module;
   a keyboard device;
   a sensing unit, configured to sense a position of the keyboard device relative to the second display module so as to output a sensing signal; and
   a control unit, configured to control a displaying image of the second display module according to the sensing signal;
   wherein the second display module further comprises:
      a display screen;
      a housing, having an inner side; and
      a sliding module, disposed within the housing, wherein the display screen is located between the keyboard device and the sliding module when the keyboard device is placed on the display screen;
   wherein the sliding module includes:
      a sliding track, disposed in the housing and being parallel to the inner side; and
      a sliding member, disposed on the sliding track, wherein the sliding member is configured to slide along the sliding track;
   wherein the portable electronic device further includes:
      a first magnet, disposed on the sliding member; and
      a second magnet, corresponding to the first magnet, wherein the second magnet is disposed on the keyboard device and is configured to generate a magnetic attracting force;
   wherein the sliding member is driven by the keyboard device to move along the sliding track by the magnetic attracting force in response to movement of the keyboard device.

2. The portable electronic device as claimed in claim 1, wherein the second display module further comprises a positioning assembly configured to position the sliding module at different positions within the housing.

3. The portable electronic device as claimed in claim 1, further comprising a limiting structure configured to limit a relative position of the keyboard device and the sliding module, wherein the limiting structure comprises the first magnet and the second magnet.

4. The portable electronic device as claimed in claim 1, wherein the second display module further comprises a positioning assembly, and the positioning assembly comprises:
   a third magnet, disposed on the sliding module; and
   a fourth magnet, disposed on the inner side, wherein a magnetic attracting force formed between the third magnet and the fourth magnet is weaker than a magnetic attracting force formed between the first magnet and the second magnet.

5. The portable electronic device as claimed in claim 1, wherein the sensing unit comprises:
   at least three position sensing components, disposed at different positions in the second display module; and
   a sensed component, disposed on the keyboard device;
   wherein the position sensing components are configured to sense the sensed component so as to output the sensing signal.

6. The portable electronic device as claimed in claim 5, wherein the position sensing components are arranged along a direction parallel to an inner side of the second display module, and a distance between two adjacent position sensing components is equal to a distance between another two adjacent position sensing components.

7. The portable electronic device as claimed in claim 1, wherein the sensing unit comprises a light sensor, a thermal sensor, an ultrasonic sensor, or an infrared sensor.

8. A method of controlling an image of a display module, applied to a portable electronic device having a first display module and a second display module, and a keyboard device, wherein the second display module comprises a display screen and a sliding module, the sliding module comprising a sliding member and a sliding track, and wherein the first display module is pivotally connected to the second display module, the method comprising:
   sensing, by a sensing unit, a position of the keyboard device relative to the second display module, so as to output a sensing signal;
   determining, by a control unit, whether the keyboard device is located on the second display module according to the sensing signal, wherein the display screen is located between the keyboard device and the sliding module when the keyboard device is placed on the display screen, and when the keyboard device is slid between a first position and a second position on the display screen, the sliding member is driven to move along the sliding track by magnetic attraction between magnets disposed on the sliding member and magnets disposed on keyboard device; and
   in response to the control unit determining that the keyboard device is located on the second display module, the control unit controlling a displaying image of the second display module; and, controlling, by the control unit, the first display module of the portable electronic device to display a displaying image and a cursor, and limiting the cursor to move within a movable range by the control unit in response to the portable electronic device being not electrically connected to an external device, wherein the movable range is defined as a range of the displaying image of the first display module.

9. The method of controlling the image of the display module as claimed in claim 8, wherein the step of the control unit controlling the displaying image of the second display module further comprises:
   in response to the control unit determining that the keyboard device is located in the first position on the second display module according to the sensing signal, the control unit controlling the first display module and the second display module of the portable electronic device to collectively display an image.

10. The method of controlling the image of the display module as claimed in claim 8, wherein the step of the control unit controlling the displaying image of the second display module further comprises:
   in response to the control unit determining that the keyboard device is located in the second position on the second display module according to the sensing signal, the control unit controlling a first portion of the second display module to display a plurality of touching icons and controlling a second portion of the second display module to display a virtual touch pad.

11. The method of controlling the image of the display module claimed in claim 10, further comprising:
   determining, by the control unit, whether the virtual touch pad of the second display module receives a touch input;

in response to the virtual touch pad receiving the touch input, the control unit obtaining a touch displacement of the touch input on the virtual touch pad according to the touch input; and controlling, by the control unit, the first display module of the portable electronic device to display a displaying image and the cursor according to the touch displacement, and controlling the cursor to move with a corresponding displacement on the displaying image.

12. The method of controlling the image of the display module as claimed in claim 8, wherein the step of the control unit controlling the displaying image of the second display module further comprises:

in response to the control unit determining that the keyboard device is located in a third position on the second display module according to the sensing signal, the control unit controlling the second display module to display a handwriting interface.

13. The method of controlling the image of the display module as claimed in claim 8, wherein the step of the control unit controlling the displaying image of the second display module further comprises:

in response to the control unit determining that the keyboard device is disposed outside the first display module and the second display module of the portable electronic device according to the sensing signal, the control unit controlling the first display module to display a first image and controlling the second display module to display a second image.

14. The method of controlling the image of the display module as claimed in claim 8, further comprising:

in response to the portable electronic device being connected to a third display module, the control unit controlling the first display module and a third display module to collectively display an image, and the movable range is defined as a range of the image.

15. A portable electronic device, comprising:
a display module;
a keyboard device;
a sensing unit, configured to sense a position of the keyboard device relative to the display module so as to output a sensing signal; and
a control unit, configured to control a displaying image of the display module according to the sensing signal;
wherein the display module further comprises:
   a display screen;
   a housing, having an inner side; and
   a sliding module, disposed within the housing, wherein the display screen is located between the keyboard device and the sliding module when the keyboard device is placed on the display screen;
wherein the sliding module includes:
   a sliding track, disposed in the housing and being parallel to the inner side; and
   a sliding member, disposed on the sliding track, wherein the sliding member is configured to slide along the sliding track;
wherein the portable electronic device further includes:
   a first magnet, disposed on the sliding member; and
   a second magnet, corresponding to the first magnet, wherein the second magnet is disposed on the keyboard device and is configured to generate a magnetic attracting force;
wherein the sliding member is driven by the keyboard device to move along the sliding track by the magnetic attracting force in response to movement of the keyboard device.

\* \* \* \* \*